Sept. 9, 1969   R. B. PAGE ET AL   3,465,844
GAS CUSHION VEHICLES
Filed June 13, 1967   8 Sheets-Sheet 1
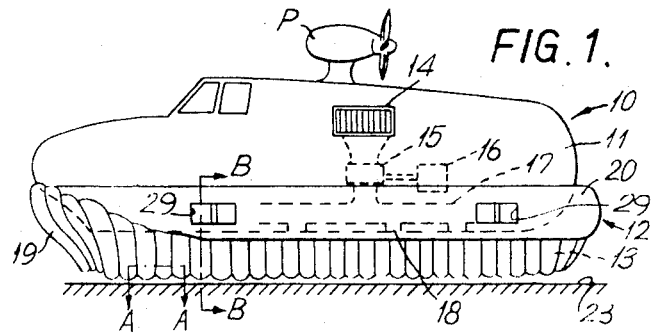
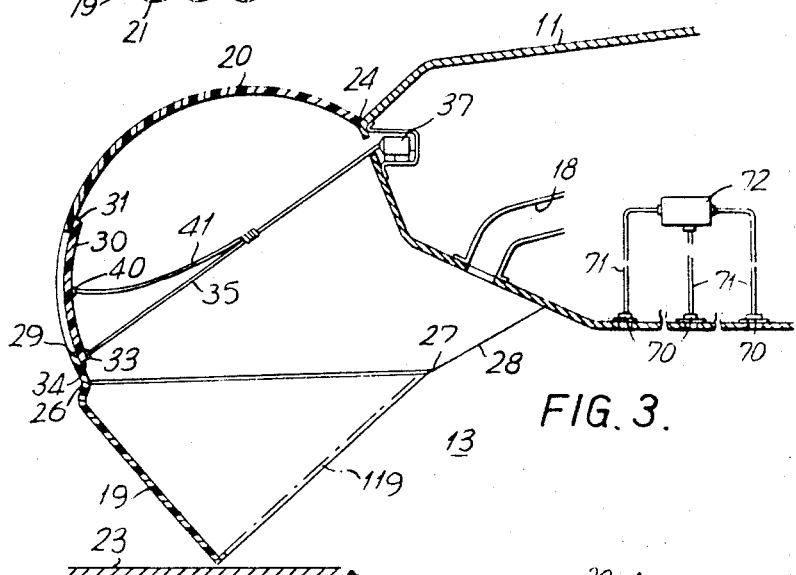
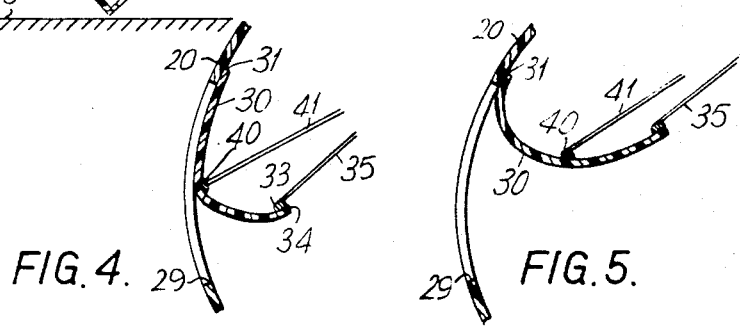
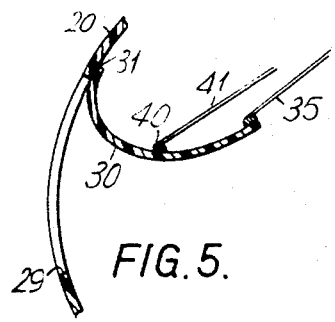
INVENTORS
R. B. PAGE
A. G. LORISTON-CLARKE
BY
Cameron, Kerkam & Sutton
ATTORNEYS Sept. 9, 1969    R. B. PAGE ET AL    3,465,844
GAS CUSHION VEHICLES
Filed June 13, 1967    8 Sheets-Sheet 2
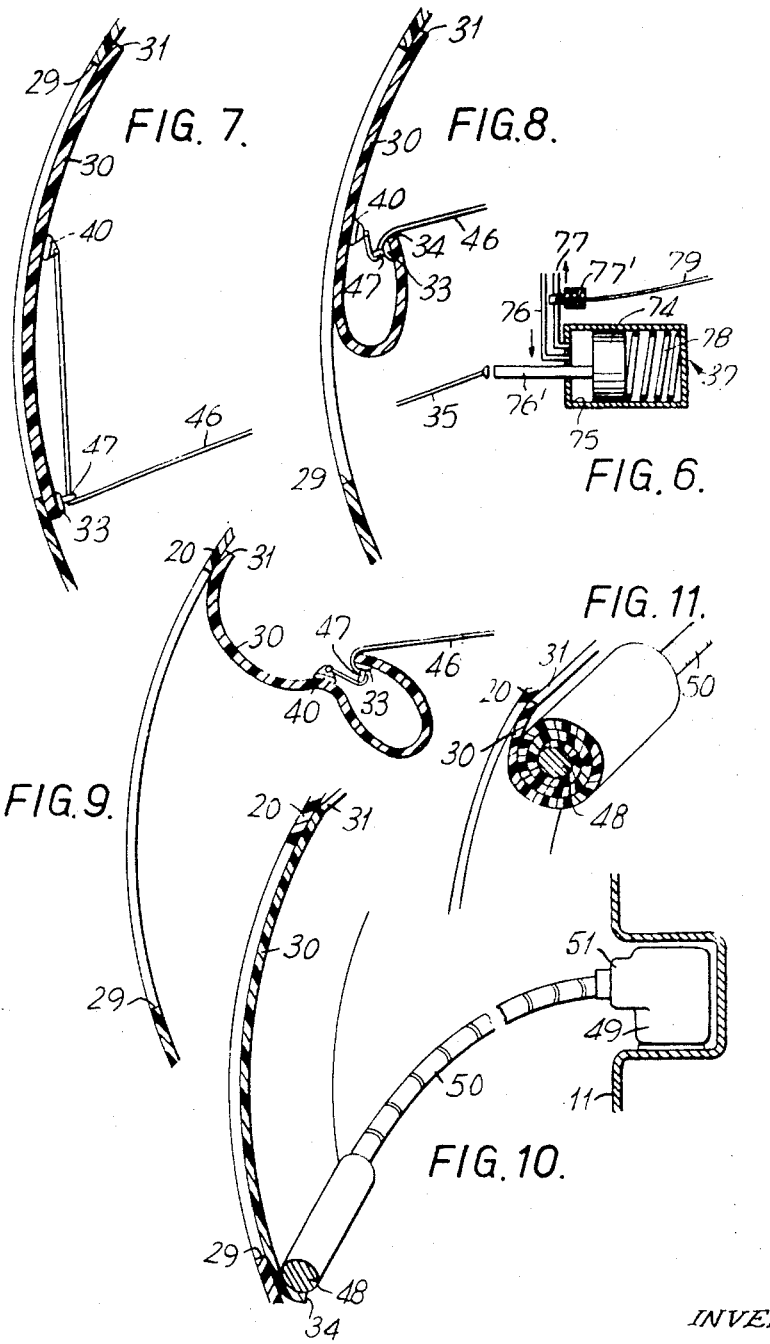
INVENTORS
R. B. PAGE
A. G. LORISTON-CLARKE
BY
Cameron, Kerkam & Sutton
ATTORNEYS Sept. 9, 1969 R. B. PAGE ET AL 3,465,844
GAS CUSHION VEHICLES
Filed June 13, 1967 8 Sheets-Sheet 3

INVENTORS
R. B. PAGE
A. G. LORISTON-CLARKE
BY
Cameron, Kerkam & Sutton
ATTORNEYS Sept. 9, 1969  R. B. PAGE ET AL  3,465,844
GAS CUSHION VEHICLES Filed June 13, 1967  8 Sheets-Sheet 4

INVENTORS
R. B. PAGE
A. G. LORISTON-CLARKE
BY
Cameron, Kerkam & Sutton
ATTORNEYS Sept. 9, 1969    R. B. PAGE ET AL    3,465,844
GAS CUSHION VEHICLES
Filed June 13, 1967    8 Sheets-Sheet 6

INVENTORS
R. B. PAGE
A. G. LORISTON-CLARKE
BY Cameron, Kerkam & Sutton
ATTORNEYS

3,465,844
GAS CUSHION VEHICLES
Reginald Bannerman Page, Tonawanda, N.Y., and Anthony Grahame Loriston-Clarke, Brockenhurst, England, assignors to Hovercraft Development Limited, London, England, a British company
Filed June 13, 1967, Ser. No. 645,781
Claims priority, application Great Britain, June 14, 1966, 26,566/66
Int. Cl. B60v 1/16
U.S. Cl. 180—118                             13 Claims

ABSTRACT OF THE DISCLOSURE

A gas cushion vehicle using gas outlet ports to moderate changes in cushion pressure tending to occur when the vehicle passes over a surface irregularity, and/or to provide the vehicle with lateral thrusts e.g. for aiding steering.

---

This invention relates to gas cushion vehicles, that is to say, to vehicles which, in operation, are supported at least in part by a cushion of pressurised gas formed and contained beneath the vehicle body.

The invention is more particularly concerned with gas cushion vehicles of the type wherein the gas cushion is laterally contained beneath the body by a wall structure or "skirt" depending from the body either alone or in combination with a curtain of moving fluid discharged downwardly around the periphery of the cushion and below the level of the skirt.

Hitherto, when such vehicles pass over a surface having irregularities such that the average skirt-surface and body-surface clearances change rapidly, the cushion pressure also undergoes rapid change, and the vehicle will "bounce" or heave. The heaving motion is undesirable from the points of view of the passengers' comfort, the strain on the fan supplying the pressurized gas and its drive-motor, and rubbing between the skirt and the surface.

According to the present invention, a gas cushion vehicle comprises a body, a flexible skirt structure depending from the body for laterally containing at least in part the vehicle-supporting cushion, said skirt structure having a gas outlet port for allowing gas contained by the skirt structure to escape to the atmosphere, a valve member of flexible sheet material for controlling the escape of gas through the port, and valve control means operable to control the position of the valve member relative to the port.

When the vehicle of the present invention is travelling over a surface which is smooth, or which has irregularities which do not affect the average skirt-surface and body-surface clearances, the port or ports may be closed by the said valve members, since under such circumstances there will not be any fluctuations in cushion pressure. However, when the vehicle is to travel over surfaces which affect the average clearance between the skirt and the surface, the cushion is supplied with gas in excess of that required to maintain the cushion, and the excess gas is allowed to escape through the port or ports in the skirt. Some gas will then escape from the cushion or from the duct surrounding the cushion through the port in the skirt at all times, generally speaking, and the port will provide an escape path for the excess gas when the average skirt-surface clearance is reduced. If the average skirt-surface clearance increases, then the excess gas will tend to escape under the skirt rather than through the more restricted path provided by the port. The effect of the port is thus to moderate any fluctuations in cushion pressure. Changes in cushion pressure due to changes in the cushion volume are also moderated by the provision of the port.

According to one embodiment of the invention, the valve member is a flap of flexible sheet material, and the flap is attached on the cushion facing side of the wall structure so that in operation the pressure of the gas contained by the skirt structure urges the flap towards a port closing position, the control means in operation serving to move the flap inwardly from its port closing position relative to the wall structure to a port opening position relative thereto. In this form, the pressure of the gas contained by the material surrounding the port tends to separate opposite regions of the closure portion, whereby to tend to maintain the port in its open configuration.

In another embodiment of the invention, a vehicle is provided with a wall means attached to and spaced from the skirt structure to define a duct and an associated port, the control means being operable to collapse the wall of the duct thereby to restrict flow of gas through said associated port.

The invention also includes a method of operating the gas cushion vehicle wherein the cushion is supplied with gas in excess of that required to maintain the cushion, and the excess gas is allowed to escape through the port or ports in the skirt structure, thereby to moderate fluctuations in cushion pressure corresponding to irregularities in the surface over which the vehicle is to travel.

In a modification, excess gas is allowed to escape to different degrees through peripherally spaced ports in the skirt structure thereby to provide the vehicle with a resultant horizontal component of thrust.

Embodiments of the invention, given by way of example only, will now be described with reference to the accompanying drawings, in which:

FIGURE 1 is a side elevation of a gas cushion vehicle in accordance with the invention, FIGURE 2 is a cross-section of the skirt of the vehicle of FIGURE 1 taken on line A—A, FIGURE 3 is a cross-sectional view of the vehicle of FIGURE 1, taken on the line B—B and shows a pressure control port in the closed position, FIGURE 4 shows the port of FIGURE 3 in the half-open position, FIGURE 5 shows the port of FIGURE 3 in the fully open position, FIGURE 6 shows some of the principal parts of a control mechanism used in FIGURE 3, FIGURE 7 is a cross-sectional view of a pressure control port showing another manner of controlling the opening of the port, FIGURES 8 and 9 show the port of FIGURE 7 respectively in the half-open and fully open position, FIGURES 10 and 11 show a further manner of controlling the opening of a pressure control port, respectively in the closed and almost fully open positions, FIGURE 12 is a plan view of the vehicle of FIGURE 1, and FIGURE 13 is a view of the vehicle of FIGURE 1 from the rear, FIGURE 14 is a cross sectional view similar to FIGURE 3 and showing another embodiment of the invention, with the ports closed by the closure portion;

FIGURE 15 shows a same view as FIGURE 14 but with the ports open;

FIGURES 16 and 17 show views corresponding to FIGURES 14 and 15 for yet another embodiment of the invention, FIGURES 18 and 19 show views corresponding to FIGURES 14 and 15 for a further embodiment of the invention;

In the following description, an item which appears in more than one figure will be given the same reference numeral in each figure.

Figure 12:
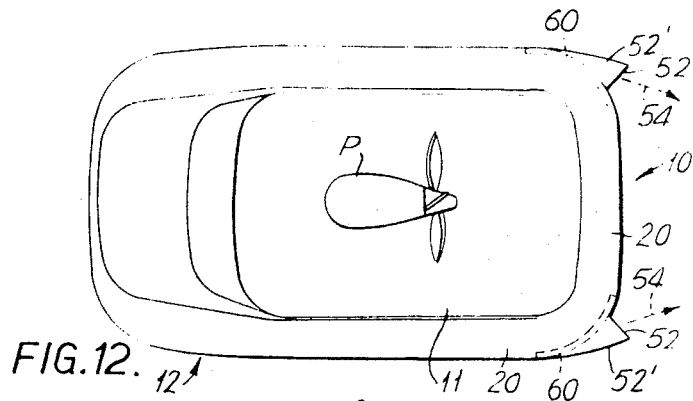

Referring first to FIGURE 1, there is shown a gas cushion vehicle, indicated generally by reference 10, comprising a body 11 and a skirt 12 which depends from the body 11 and provides the lateral containment of a gas cushion 13 formed beneath the body 11. In this case, the gas cushion is formed from air which is induced at intake 14 by a fan 15 driven by a motor 16, and compressed and discharged to the space for the gas cushion 13 via a main distribution duct 17 and a number of discharge ducts 18. The vehicle 10 is propelled by an air-screw propeller unit P.

The skirt 12 is formed from flexible sheet material such as rubber sheet or rubberised fabric so that it can deflect over obstacles in the path of the vehicle 10, and comprises a succession of wall elements 19 arranged side by side and which depend from the body 11 at the front of the vehicle 10 and from an upper skirt section 20 at the sides and rear of the vehicle 10. As will be seen from FIGURE 2, each wall element 19 is formed from a substantially triangular piece of flexible sheet material which has been folded to a U-shape with the arch 21 of the U-shape outwardly disposed, with respect to the cushion 13, of the limbs 22, and inclined with respect to the surface 23 beneath the vehicle 10 at an angle of about 45°. In operation, the air in the cushion 13 inflates the wall elements 19 into abutment with each other so that substantially no air can escape between the wall elements 19. Further particulars as to the construction of the wall elements 19 to urge adjacent limbs of neighbouring elements are disclosed in Patent No. 3,420,330.

It will be appreciated that at the rear of the vehicle 10, the wall elements 19 in the form so far described will have a scooping action as the vehicle 10 moves forwardly, more particularly over water, and this can lead to damage of the wall elements 19, as well as causing large drag forces with the surface 23. In order to avoid damage and drag from this cause, the wall elements 19 at the rear of the vehicle are provided with a membrane 119 (shown dotted in FIGURES 2 and 3) which extends between the limbs 22 of each wall element 19 leaving a small gap between the lower edge of the arch 21 and the membrane 119. The wall elements 19 at the rear of the vehicle 10 are thus substantially in the form of open topped conical bags with a small hole or gap at the bottom. The hole serves as a drainage hole for water or debris which may have entered the bag, e.g. through the open top.

Referring to FIGURE 3, it will be seen that the upper skirt-section 20 is formed from a sheet of flexible sheet material attached to the body 11 at its upper edge 24, the wall elements 19 being attached by their outermost top edges to the lower edge 26 of the upper skirt section 20 and by their innermost extremities 27 to movable tie-cords 28. The flexible sheet material of the wall elements 19 and the upper skirt section 20 has a thickness, in practice, of about one fortieth of an inch, but the thickness has been exaggerated in the drawings for clarity. The air of the air cushion 13 inflates the skirt 12 to the configuration as depicted in FIGURES 1, 2 and 3 in which the upper skirt section 20 extends first away from the body 11 and then downwardly and somewhat inwardly in a smooth curve. The skirt 12 can be moved towards and away from the body 11 by means of the tie-cords 28 so that the position of the centre of pressure of the air-cushion relative to the body 11 can be varied to control the trim of the vehicle 10.

It will be seen from FIGURE 1 that two ports 29 are formed in the upper skirt section 20, one of which is near the front of the vehicle 10 and the other near the rear.

As will be apparent from FIGURE 3, a flap 30 of flexible sheet material constituting a valve member is hingedly attached to the cushion facing side of the upper skirt section 20 by its upper edge 31 in such manner that it will cover and close the port 29 under the influence of the pressure of cushion 13. The material of the flap 30 has a thickness similar to that of the material of the skirt 12. A stiffener 33, e.g. of semi-rigid plastic tubing is attached along the lower edge 34 of the flap 30 and a number of tie-cords 35 (only one of which can be seen) are attached to the stiffener 33, the tie-cords 35 extending into a recess in the body 11, to an electro-hydraulic control mechanism 37. When the control mechanism 37 is actuated, the lower edge 34 of the flap 30 is pulled inwardly away from its port-closing position against the pressure forces of the gas cushion 13. A second stiffener 40 of semi-rigid plastic tubing is attached to the flap 30 about half-way between its upper and lower edges 31, 34, and a number of tie-cords 41 (of which only one is visible in FIGURE 3) are attached to the stiffener 40 at one of their ends, and are attached at their other ends to the tie-cords 35. The length of the tie-cords 41 is chosen to be such that they are slack when the port 29 is closed, and become tensioned when the cords 35 have pulled the lower half of the flap 30 away from the port.

In FIGURE 4, the lower half of the flap 30 has been pulled inwardly by operation of the tie-cord 35 so that half of the port 29 is open; at this stage, the tie-cord 41 becomes tensioned. The upper half of the flap 30 is maintained in its port-closing position by the pressure forces of the cushion, and the lower half of the flap 30 is moved towards the upper half of the flap which thereby assumes a curved configuration under the influence of the tension in tie-cord 35 and the cushion pressure on its upper side, and the reduced pressure on its lower side due to the air escaping from the port 29. The curved configuration ensures that when the tie-cord 35 is released, the flap 30 will progressively return to its port-closing position without the risk that it will be crumpled unevenly against the port 29 and possibly blown out of the port 29.

In FIGURE 5, tie-cord 35 has been pulled further inwardly by the control mechanism 37, pulling the tie-cord 41 with it, and the whole flap 30 is pulled into a curved configuration clear of the port 29, leaving the port 29 unobstructed.

The stiffeners 33 and 40 may be jointed and the tie-cords 35, 41 attached to the joints (not shown). In this arrangement, when the tie-cords 35, 41 are released, the regions of the flap 30 around the joints move towards the port behind the remainder of the flap, and the pressure conditions thus created are found to make the flap return to its port-closing position more evenly and with less risk of crumpling against the material around the port 29.

When the port 29 is opened, air from the cushion 13 will be able to escape therethrough, the rate of escape of the air depending on the degree of opening of the port 29 and the pressure of the cushion 13.

The control of the opening of the ports 29 to regulate the pressure of the cushion 13 can be either at the volition of the vehicle driver or automatic, as will now be described by way of example with reference to FIGURES 3 and 6. The vehicle body 11 is provided with a number of pressure-sensitive devices 70, such as pressure switches which are responsive to the rate of change of pressure, and each device 70 regulates the electric current in a respective electrical conductor 71. The average current in the conductors 71 is used to actuate an electrical relay 72 which regulates the electrical power supply to a solenoid-operated valve of the electro-hydraulic control mechanism 37 which controls the tie-cords 35.

Referring now to FIGURE 6, it will be seen that the electro-hydraulic control mechanism 37 comprises a piston 74 received in a cylinder 75. The motion of the piston 74 is communicated to the tie-cord 35 by means of a piston rod 76'. Hydraulic fluid is pumped into the cylinder 75 on one side of piston 74 through tube 76, and a tube 77 provides an exit from the cylinder 75. The flow of hydraulic fluid through the cylinder 75 is controlled by a solenoid-operated valve 77' which controls the flow through the tube 77. Normally, the current from the relay 72 of FIGURE 3 operates to maintain the solenoid valve 77' open so that the static pressure of the hydraulic fluid is low. On the other side of the piston 74 from the hydraulic fluid is provided a compression spring 78 which is sufficiently powerful to maintain the piston 74 at the left-side (as seen in FIGURE 6) of the cylinder 75 so that the tie-cord 35 is slack and the port 29 is closed. If the current to the solenoid valve 77' changes so that the flow of fluid through the cylinder 75 is impeded, the static pressure of the fluid in the cylinder will increase, and the piston will move to the right (as seen in FIGURE 6) causing the tie-cord 35 and possibly the tie-cord 41 also, to be pulled, thus opening the port 29 to a degree corresponding with the rate of change of the average cushion pressure.

The ports 29 may be opened at the volition of the driver by providing an over-ride control link 79 connected at one end to the solenoid valve, and at the other end, to a hand control-lever (not shown).

Since any changes in the pressure of the air cushion 13 are likely to require prompt corrective action, if heaving of the vehicle 10 is to be minimised, it is desirable that the automatic control system for opening and closing the port 29 should have a minimum of inertia and the smallest possible response-time lags.

FIGURE 7 shows an arrangement whereby the flap 30 can be progressively and controllably moved from its port-closing position by a single tie-cord 46. In this case, the tie-cord 46 is secured at one of its ends to the stiffener 40 in the central region of the flap 30 and slidably passes through guide means provided by an eyelet 47 provided on the stiffener 33 attached to the lower edge 34 of the flap 30. The tie-cord 46 is fastened at the other of its ends to an electro-hydraulic control mechanism (not shown) such as the mechanism 37 of FIGURES 3 and 6. When the tie-cord 46 is pulled, the initial effect is to cause the stiffener 33 to slide along the tie-cord 46, towards the stiffener 40, leaving the material of the lower half of the flap 30 curved downwardly between the stiffeners 34, 40 under the influence of the cushion pressure above the flap 30 and the reduced pressure below the flap 30. In FIGURE 8, the flap 30 is shown in this intermediate position, whereat the port 29 is substantially half open. Further pulling of the tie-cord 46 causes the remainder of the flap 30 to be drawn away from port 29 in a progressive and controllable manner, until the port 29 is fully open, as shown in FIGURE 9. When it is desired to close the port 29, the tie-cord 46 is released, and the flap 30 returns in a progressive and controllable manner to its port-closing position. The tie-cord 46 may pass through an eyelet (not shown) in the flap 30, instead of one attached to the stiffener 33 as illustrated.

In the arrangement of FIGURE 10, the flap 30 is hingedly attached to the upper skirt section 20 by its upper edge 31 and is attached to the periphery of a roller 48 at its lower edge 34. The flap 30 is forced against the upper skirt section 20, in operation, by the pressure of the cushion 13 so that it closes the port 29. The roller 48 is connected by a flexible shaft 50 and a high-reduction gear-box 51 to a reversible electric motor 49 in a recess in the side of the vehicle body 11. When the motor 49 is energised, the shaft 50 and the roller 48 are rotated, the flap 30 is wound about the roller 48 in a controlled and progressive manner as shown in FIGURE 11 until the motor 49 is stopped. The high-reduction gearbox 51 provides sufficient friction to prevent rotation of the roller 48 when the motor 49 is not energised. When it is desired to close the port 29, the motor 49 is energised for rotation in the opposite sense to that for opening the port 29 and the flap 30 unwinds progressively over port 29 under the aerodynamic forces provided by the cushion pressure on its cushion-facing side and the pressure of the escaping air on its port-facing side.

Figure 13:
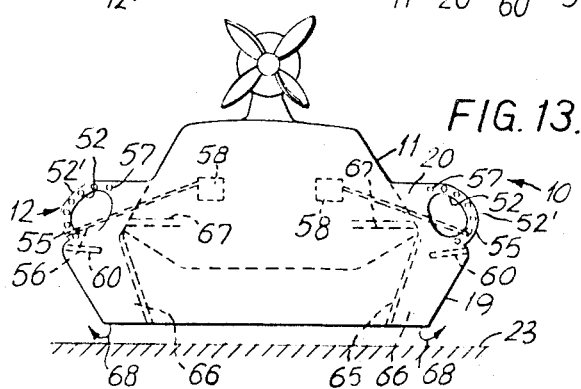

FIGURES 12 and 13 show a form of port which is preferred for the rear of the vehicle 10. It will be seen that while the upper skirt section 20 generally follows the plan outline of the body 11, at the junction between each side and the rear of the vehicle 10 a duct 52' is formed having an associated port 52. The ports 52 are arranged for discharging air from within the cushion 13 in a generally rearward direction, as indicated by the arrows 54 in FIGURE 12. A number of eyelets 55 are provided in the flexible sheet material around the outer sides of the ports 52, and draw-strings 56 are threaded through the eyelets 55, after which one end of each draw-string 56 is knotted, as at the uppermost eyelet 57, so as to attach the draw-string to the material around the port 52, while the other end is attached to an electro-hydraulic control mechanism 58 depicted schematically in FIGURE 13. In operation, the pressure of the cushion 13 and the discharge of air from the ports 52 maintains the latter in their open configuration. If it is desired to close the ports 52, the control mechanisms 58 are operated such that the draw-strings 56 are tensioned and pulled inwardly towards the vehicle body 11 causing the material around the ports 52 to be drawn inwardly to collapse the ducts 52' so that the ports 52 are restricted.

In order that the skirt 12 can be maintained in the configuration illustrated in FIGURES 1, 3, 12 and 13, it is necessary to ensure that the pressure forces provided by the air-cushion 13 on each part of the skirt 12 are balanced by equal and opposite forces elsewhere. If this requirement were not met, the skirt 12 would distort until a configuration providing such a balance of forces were attained. At the sides and rear of vehicle 10, the skirt 12 is so designed that the forces acting upwardly on the underside of the upper skirt section 20 due to the cushion 13, are balanced by the forces acting downwardly on the upper sides of the wall elements 19. The ports 52 in the upper skirt section 20 are provided in effect by removing a portion of the upper skirt section 20, and correspondingly, the forces acting upwardly on the upper skirt section 20 in the region of the ports 52 are smaller, due to the smaller area available, than the forces acting downwardly on the wall elements 19 immediately below the ports. Accordingly, the skirt 12 is downwardly urged by the forces of the gas cushion 13 at the junction of its rear and longitudinal side sections and to prevent the junction from dragging on the surface 23, the skirt is stiffened by the provision of horizontal stiffening bands 60 of nylon or like synthetic plastics material which are attached on the cushion-facing side of the skirt 12 at the joint between the lower edge 26 of the upper skirt section and the top edges of the wall elements 19. The bands 60 serve to distribute the unbalanced forces which act downwardly on the junction of the sides and rear sections of the skirt 12 to the side and rear sections of the skirt 12.

As previously explained, the ports 29 or 52 can be used to maintain the pressure of the cushion 13 at a substantially constant value when the surface 23 over which the vehicle 10 is travelling is such that the average clearance between the skirt 12 and the surface 23 varies, and also to provide thrusts on vehicle 10, more particularly for maneuvering at low speeds. It is preferred that the ports 52 at the rear of the vehicle 10 are normally used for maintaining the pressure of the cushion since any discharge of cushion air therefrom will increase the forward propulsive thrust on the vehicle 10, while ports 29 at the sides of the vehicle 10 are normally used to provide side thrusts for manoeuvring or for correcting yaw due, for instance, to the action of transverse winds. However, in conditions of operation where the surface 23 is very irregular and leads to severe variations in the average clearance between the skirt 12 and the surface 23 and between the body 11 and surface 23, the ports 29 would be opened, in addition to the ports 52, to help maintain the pressure of the cushion 13 at a substantially constant value.

It will be apparent that the opening and closing of the port 29 in FIGURES 7 to 9 and FIGURES 10 and 11 and of the port 52 in FIGURES 12 and 13 can be regulated automatically in a similar manner to that described in relation to FIGURES 3 and 6.

When the invention is applied to gas cushion vehicles wherein the gas cushion is contained by a skirt and a curtain of moving fluid discharged downwardly at the periphery of the vehicle-supporting cushion, the curtain forming fluid issues from one or more ports in the body and is downwardly guided by the cushion-facing side of the skirt, the port(s) 29 or 52 being provided in the skirt in the manner previously described. The curtain-forming fluid is usually segregated from the vehicle-supporting cushion by means of a flexible wall which is inwardly spaced from the skirt so as to define a downwardly-directed duct for the fluid. In FIGURE 13, there is shown in chain-dotted lines a flexible wall 65 of rubber sheet or rubberised fabric which is inwardly disposed of the skirt 12 to define a duct 66 for curtain-forming fluid. The fluid, in this case air from the fan 15, is supplied to the duct 66 from supply ducts 67 terminating in ports at the sides of the body 11. The air is guided from the ports by the duct 66 and is discharged downwardly and somewhat inwardly from the duct 66 in the form of a curtain 68 which serves to contain the air in the cushion below the level of the skirt 12. The inward inclination of the air-curtain 68 enables the outward pressure of the cushion to be resisted, and also ensures that air from the curtain 68 can be supplied to the cushion to maintain the pressure of the cushion. When the ports 29 or 52 are open, some of the curtain-forming air will be discharged therethrough from duct 66. The curtain 68 will thus be depleted in air (compared to the curtain when the ports 29 or 52 are closed) and will be weaker. In consequence, the curtain 68 will be less effective in containing air in the vehicle-supporting air-cushion and in supplying air to maintain the cushon. The pressure in the air-cushion will thus be less when the ports 29 and/or 52 are opened than when the ports are closed, and it will be appreciated that by regulating the opening and closing of the ports 29, 52, fluctuations in the pressure of the air-cushion can be moderated to avoid heaving or bouncing of the vehicle 10. The air discharged from the ports 29, 52, can be used to provide lateral thrusts in the manner, and for the purposes, previously described. The air supplied to the duct 66 may be supplemented by engine exhaust gases and/or water spray to supplement its effectiveness in containing the cushion.

The various features of the vehicle described may be used in any combination without departing from the invention. For example, the arrangement of the ports 52 at the rear of the vehicle 10 can be replaced by any of the arrangements of FIGURES 3 to 11, and the arrangement of the ports 29 at the sides of the vehicle 10 can be replaced by any of the arrangements of FIGURES 3 to 11, and the arrangement of the ports 29 at the sides of the vehicle 10 can be replaced by the arrangement of FIGURES 12 and 13.

In accordance with another embodiment of the invention (FIGS. 14 and 15), the flap 30 is associated with a number of similar tie-cords 35 each of which passes from the stiffener 33 through an associated guide loop 36 on the skirt section 20. The cord 35 is maintained in a continual state of tension by a tension spring means 38 which links the other end of the cord 35 with the vehicle body 11 and which constitutes, with the cord 35, a biasing means urging the flap into closing relationship with the port 29. Each of the other tie-cords 41 (of which only one can be seen) extends from the associated stiffener 40 at one of its ends to a recess 39 in the body 11 where it is attached to an electro- and/or hydraulic control mechanism 37. When the control mechanism 37 is actuated, the central portion of the flap 30 is pulled inwardly away from its port-closing position against the restraining action of the biasing means, to the position shown in FIGURE 15, for example.

For a more detailed description of the operation of the control mechanism, reference should be made to the operation above described with reference to the embodiment shown in FIGURES 1–12 from whence it will be seen that the control of the opening of the ports 29 to regulate the pressure of the cushion 13 can be at the volition of the vehicle driver or can be automatically effected by a number of pressure sensitive devices 70 (FIGURE 3) located in the cushion space 13.

In accordance with yet another embodiment of the invention (FIGS. 16 and 17) the spring 38 of the previous arrangement is omitted and the tie-cords 35 and 41 are formed by a single length of cord 100 which passes round a pulley 101 mounted for rotation in the vehicle body 11. The element 37 is likewise omitted and is replaced by an actuating mechanism 102 which, with the tie-cords 35, 41, provides a single mechanical means for controlling the flap 30. In more detail, the mechanism 102 includes a member 103 secured to the tie-cord 35 at 104 and slidable in a cylindrical casing 105 which is secured in an appropriate bore 106 in the vehicle body 11. In the position illustrated in FIGURE 16, the member 103, which may be operated manually or by an appropriate control mechanism as in the preceding embodiments, is in its position of maximum withdrawal into the casing 105 thereby producing in the tie-cord 35 a tension effective to hold the flap 30 in closing relationship with the port 29. In FIGURE 17, the member 103 is shown in an extended position in which it tensions the tie-cords 41 to hold the flap 30 in opening relationship relative to the port 29. It will be appreciated that when the member 103 is acting in a sense to increase the tension applied to one of the two tie-cords 41 and 35, it is at the same time decreasing the tension applied to the other of the two tie-cords so that the appropriate motion of the flap 30 is permitted.

Figure 15:
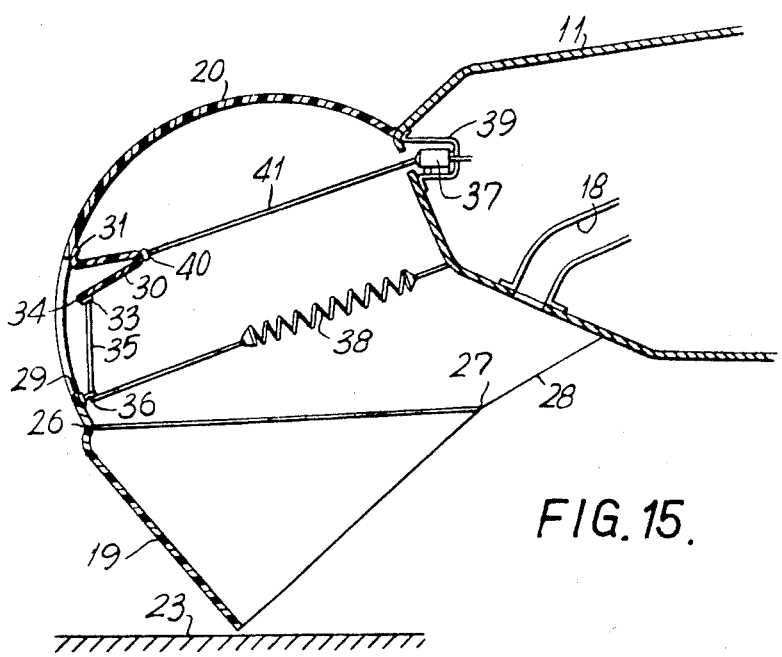
Figure 16:
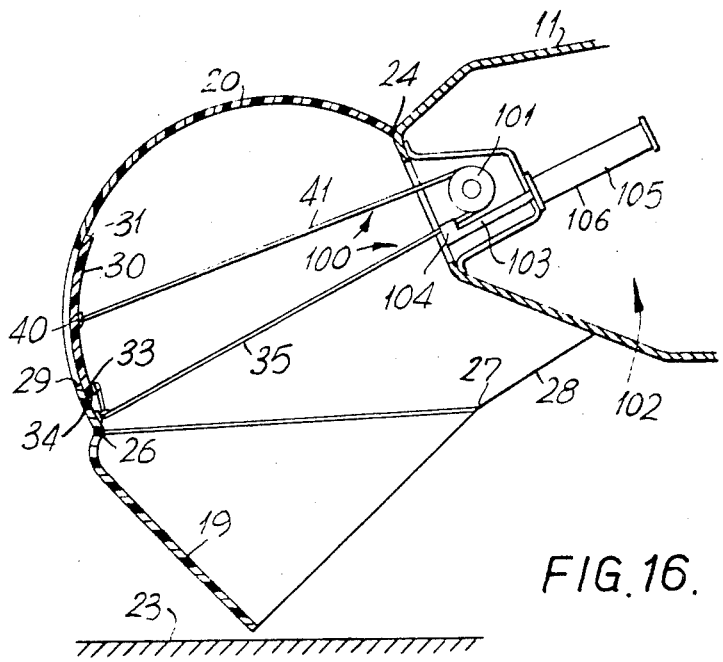
Figure 17:
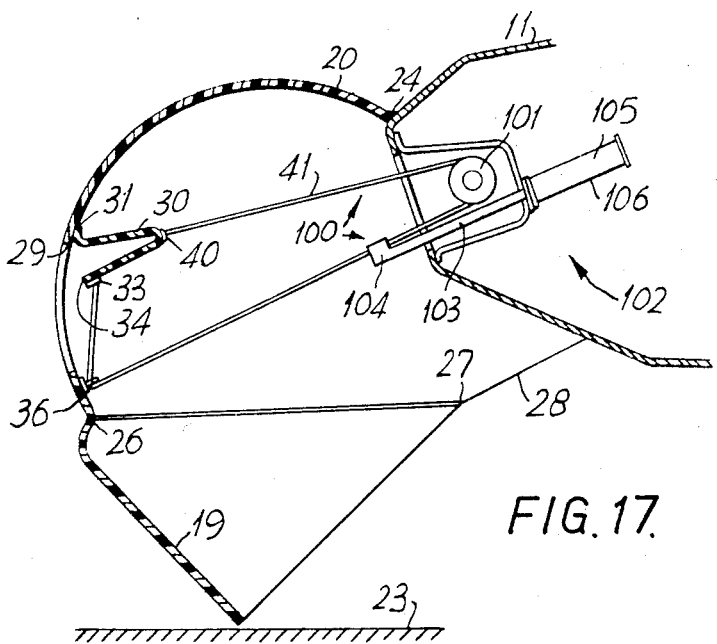
Figure 18:
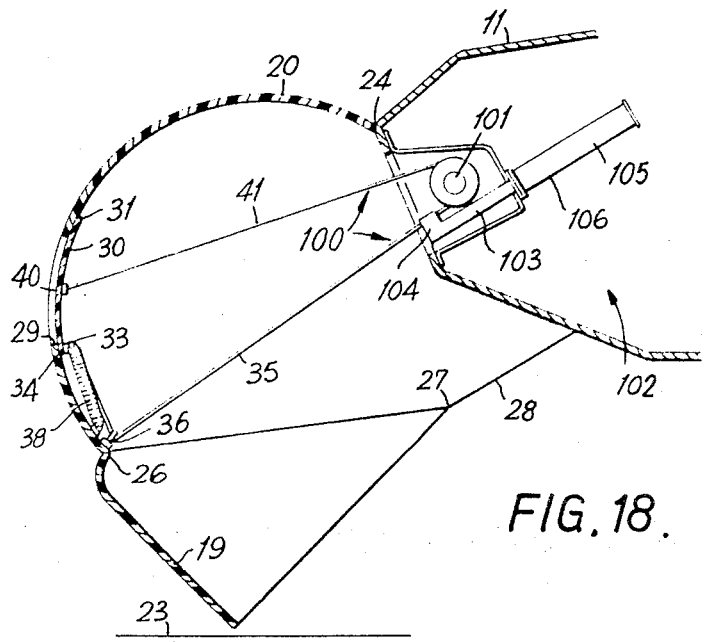
Figure 19:
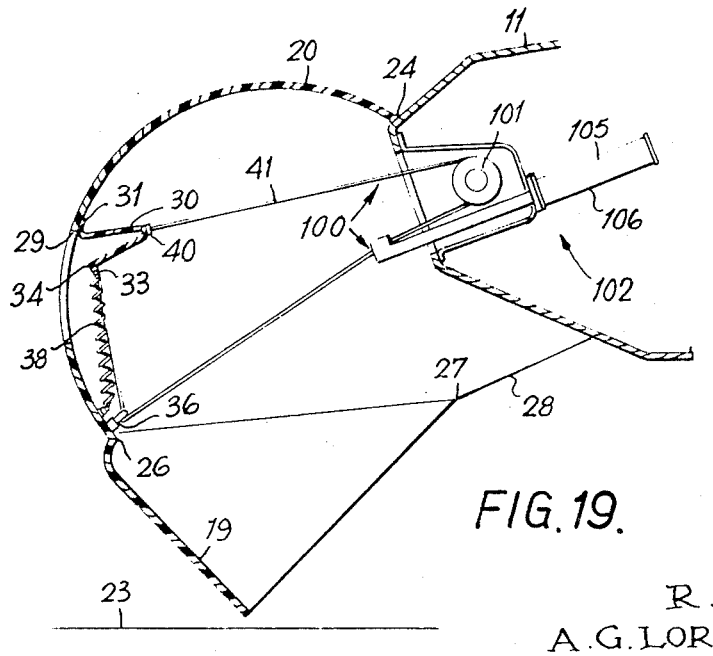

In a further embodiment of the invention (FIGURES 18 and 19) the arrangement of FIGURES 16 and 17 is modified by the inclusion of a tension spring means 38. The spring means, which is preferably a low rate constant force spring, provides a biasing action similar to that provided by the spring 38 in the arrangement of FIGURES 14 and 15 and may, in fact, be positioned in any manner which allows it to apply tension to that portion of the cord 100 between the lower edge 34 of the flap 30 and the attachment at 104. In the preferred arrangement, however, the biasing spring is positioned as shown with one end attached to the lower edge 34 of the flap 30 and the other end attached to some point in the skirt section 20 below the port 29.

Figure 14:
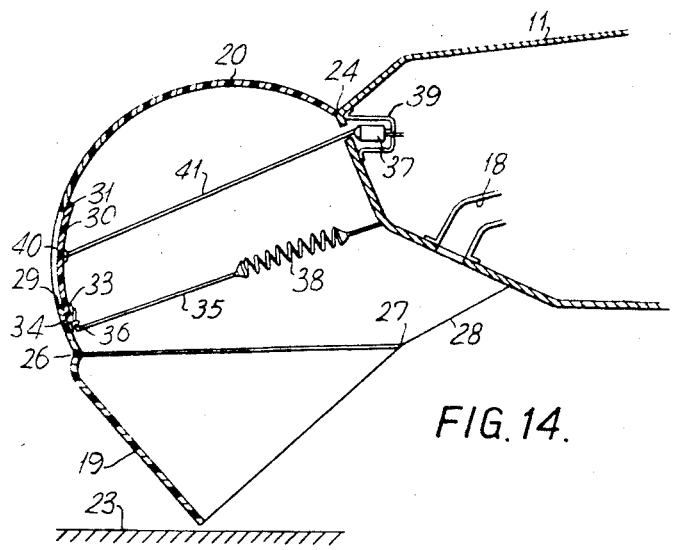
Figure 20:
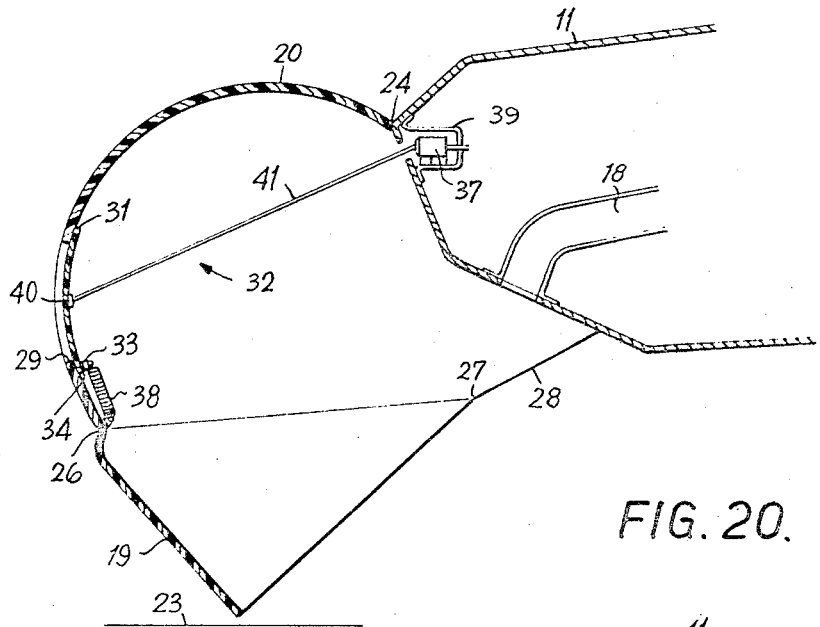
FIGURES 20 and 21 show a modification of the vehicle of FIGURES 14 and 15.
Figure 21:
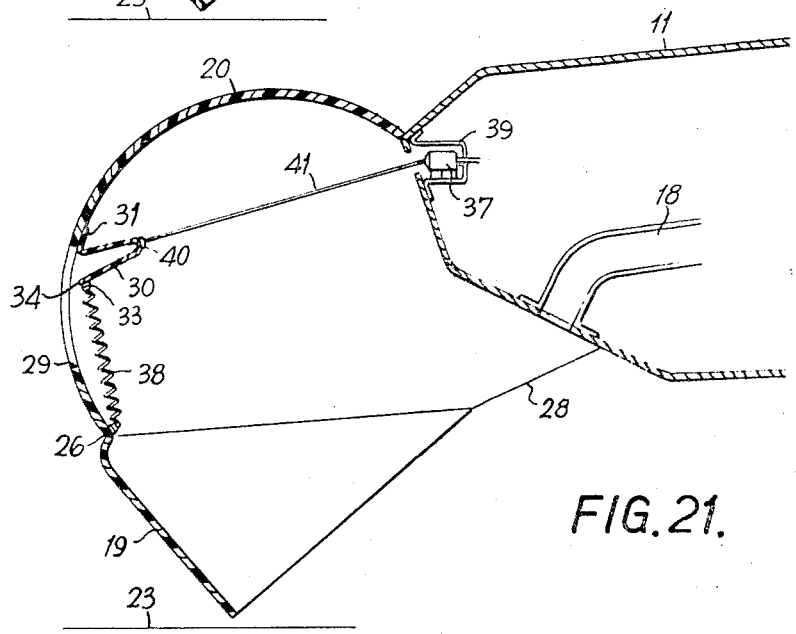

It will be appreciated that the arrangement shown in FIGURES 14 and 15 could also be modified by positioning the spring 38 in the position above described instead of in the position shown in the FIGURES 14 and 15, and this modification is shown in FIGURES 20 and 21.

An advantage of the closure arrangements of FIGURES 14–21 as compared with those disclosed in the remainder of the specification is that the cushion pressure within the skirt 12 assists the closing action of the tie-cord 35 when the flap 30 is in (or moving towards) its closed position (as illustrated in FIGURES 14 and 16) and assists the opening action of the tie-cord 41 when the flap 30 is in its open position (as illustrated in FIGURES 15 and 17).

Thus in the position of FIGURES 14 and 16, the outward curvature of the skirt section ensures that the two halves of the flap 30, in its closed position, present a slightly concave surface to the cushion space and the cushion pressure acts on this concave surface to provide an outwards force on the flap which reinforces the closing action of the tie-cord 35. However, when the central portion of the flap 30 is pulled into the cushion space by the tie-cord 41, as shown in FIGURES 15 and 17, for example, the two halves of the flap present an acute angle to the cushion space. In this latter condition, the cushion pressure produces an upwards force on the lower of the two flap halves tending to press the lower flap half up towards the upper flap half and thereby maintain the flap in its open position. At the same time, however, the cushion pressure is producing downwardly acting forces on the upper of the two flap halves thereby to assist movement of the flap 30 into closing relationship with the port 29 when such movement is subsequently allowed by the tie-cord 41.

Figure 22:
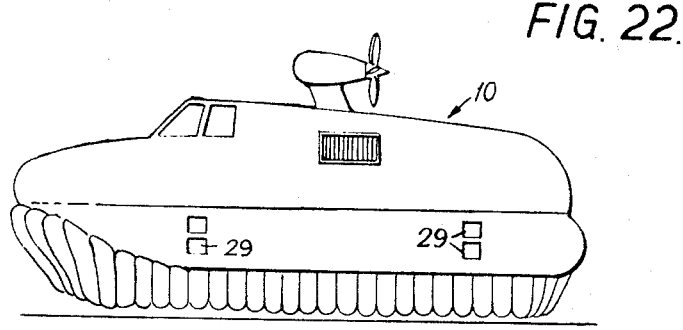
FIGURES 22 and 23 show an alternative form of gas cushion vehicle to that shown in FIGURE 1.
Figure 23:
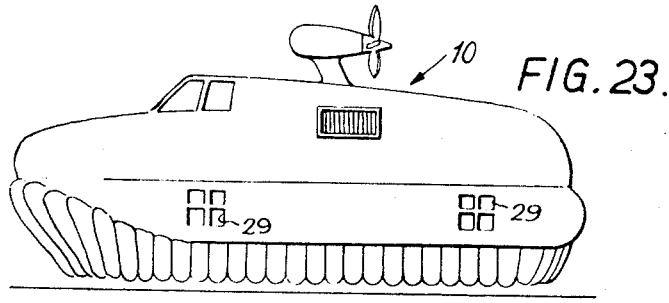
Figure 24:
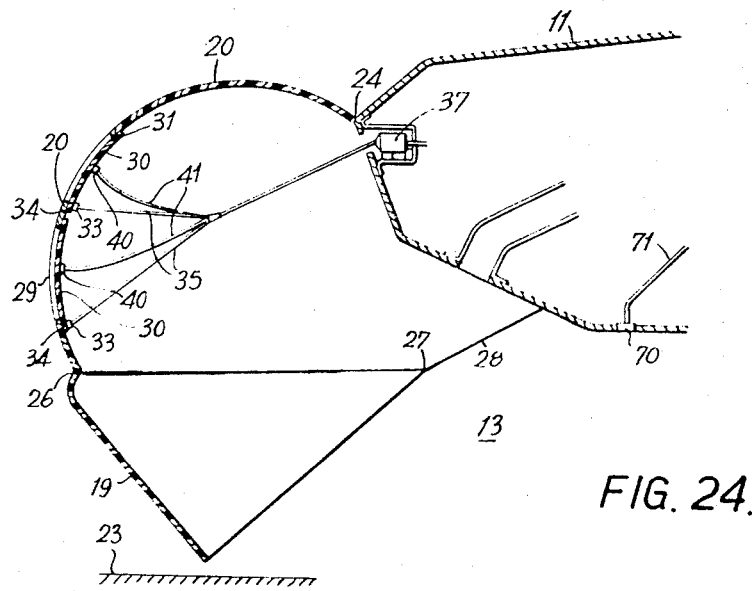
FIGURE 24 shows an actuating system in accordance with the invention.

The operation of the gas cushion vehicle according to the invention, has for convenience been described in detail for a single port and its associated closure portion. It will be appreciated however, that the invention is equally useful when the vehicle has two or more ports grouped together in a laterally separated "side-by-side" relationship (as shown in FIGURE 1, for example) or where the vehicle has ports grouped instead (or additionally) in a vertically separated relationship with the lower edge of one port adjacent the upper edge of another (as shown in FIGURES 22 and 23, for exmaple). In these latter cases the equivalent control operations to those above described may be effected by any of the control means in accordance with the invention by use of any suitable system of tie-cords connecting the closure portions concerned to a common control arrangement. An example of such a system is shown in FIGURE 24, and is identical in operation with the system of FIGURE 3 except that a greater number of flaps 30 are now used.

We claim:

1. A gas cushion vehicle comprising a body, a flexible skirt structure for laterally containing, at least in part, the vehicle-supporting cushion, said skirt structure having an upper part formed of flexible sheet material attached at its upper edge to the body of the vehicle and extending first outwardly away from the body and then downwardly and inwardly in a relatively smooth curve, the interior of said skirt structure being in direct communication with the gas cushion, port means in said upper part of the skirt structure for allowing gas contained by the skirt structure to escape to atmosphere, a valve member formed of flexible sheet material for controlling the escape of gas outwardly through the port, said valve member being so attached to the upper part of the wall structure on the cushion facing side thereof that the pressure of the gas contained by the skirt structure normally urges the valve member towards a port closing position, and valve control means operable to positively move the valve member from its port closing position to a port opening position against the pressure of the gas cushion.

2. A gas cushion vehicle as claimed in claim 1, wherein the control means comprise a tie means for applying a pull to a region of the flap remote from its points of attachment to the wall structure, thereby to pull the flap away from the port and, at least initially, to move said region of the flap towards said point of attachment.

3. A gas cushion vehicle as claimed in claim 1 wherein the control means include a roller attached to a part of the periphery of the flap remote from the point of attachment thereof to the wall structure, and means for rotating the roller to wind up or pay out the valve flap.

4. A gas cushion vehicle as claimed in claim 1, including a wall means attached to and spaced from the skirt structure to define a duct and an associated port, and means operable to collapse the wall of the duct thereby to control the flow of gas through said associated port.

5. A gas cushion vehicle as claimed in claim 4 wherein the edge region of the duct adjacent the port is apertured and the means for collapsing the duct includes a tie cord attached to the edge region of the duct at one of the apertures and passing through the remaining apertures, said tie cord being operative when tensioned to draw the walls of the duct towards one another to restrict the size of the port.

6. A gas cushion vehicle comprising a body, a flexible skirt structure depending from the body for laterally containing, at least in part, the vehicle supporting cushion, port means in said skirt structure for allowing gas contained by the skirt structure to escape to atmosphere, a valve flap formed of flexible sheet material for controlling the escape of gas through the port, the flap being attached to the wall structure on the cushion facing side thereof so that in operation the pressure of the gas cushion urges the flap towards a port closing position, and means for controlling the position of the valve flap, said control means including tie means operative to apply a pull to a part of the periphery of the flap remote from its point of attachment to the wall structure, and to an intermediate part of the flap located between said point of attachment and the said part of the periphery of the flap, so as to move the flap inwardly from its port closing position towards a port opening position.

7. A gas cushion vehicle as claimed in claim 6 wherein a first stiffening member is attached to the said part of the periphery of the flap, and a second stiffening member is attached to the said intermediate part of the flap, the said tie means being attached to the said stiffening members.

8. A gas cushion vehicle as claimed in claim 7 wherein the stiffening members are articulated and said tie means are attached to the stiffening members at or adjacent the articulations.

9. A gas cushion vehicle as claimed in claim 6 wherein guide means are located at said part of the periphery of the valve flap remote from its point of attachment thereof to the wall structure and the tie means pass through said guide means to said intermediate part of the flap.

10. A gas cushion vehicle as claimed in claim 9 wherein a first stiffening member is attached to said intermediate part of the flap, a second stiffening member is attached to said remote part of the flap, said tie means is attached to said first stiffening member, and said guide means is attached to said second stiffening member.

11. A gas cushion vehicle as claimed in claim 6 including means for generating a signal in accordance with the rate of change of pressure of the gas cushion, operatively connected to the said control means to regulate opening and closing of the valve flap by said tie means.

12. A method of operating a gas cushion vehicle having a flexible skirt structure for laterally containing, at least in part, the vehicle supporting cushion, said skirt structure having at least one port therein for allowing gas contained by the skirt structure to escape to atmosphere, comprising the steps of supplying the cushion with gas in excess of that required to maintain the cushion, and so controlling the escape of excess gas through said port in the skirt structure as to moderate fluctuations in cushion pressure due to irregularities in the surface over which the vehicle travels.

13. A method of operating a gas cushion vehicle having the cushion with gas in excess of that required to least in part, the vehicle supporting cushion, said skirt structure having a plurality of peripherally spaced ports therein for allowing gas contained by the skirt structure to escape to atmosphere, comprising the steps of supplying the cusion with gas in excess of that required to maintain the cushion, and allowing the excess gas to escape to different degrees through said peripherally spaced ports in the skirt structure so as to provide the vehicle with a resultant horizontal component of thrust.

References Cited

UNITED STATES PATENTS 3,181,636  5/1965  Cockerell _____ 180—118
3,275,270  9/1966  Earl et al. _____ 180—116 X
3,362,499  1/1968  Tripp _____ 180—128 X A. HARRY LEVY, Primary Examiner U.S. Cl. X.R.

180—127

UNITED STATES PATENT OFFICE
CERTIFICATE OF CORRECTION

Patent No. 3,465,844                            September 9, 196

Reginald Bannerman Page et al.

It is certified that error appears in the above identified patent and that said Letters Patent are hereby corrected as shown below:

Column 2, line 31, "alowed" should read -- allowed --. Column 3, line 41, after "19" insert -- to urge adjacent limbs of neighbouring elements --; lines 43 and 44, cancel "to urge adjacent limbs of neighbouring elements --. Column 4, line 18 after "tubing" insert a comma; line 27, cancel "of semi-rigid plastic tubing". Column 7, lines 68 to 70, cancel "any of the arrangements of FIGURES 3 to 11, and the arrangement of the ports 29 at the sides of the vehicle 10 can be replaced by --. Column 9, line 32, "exmaple" should read -- example --; line 6. "points" should read -- point --. Column 10, line 67, "the cushion with gas in excess of that required to " should read -- a flexible skirt structure for laterally containing, at --.

Signed and sealed this 5th day of May 1970.

(SEAL)
Attest:

EDWARD M.FLETCHER,JR.
Attesting Officer

WILLIAM E. SCHUYLER, JF
Commissioner of Patents